(No Model.)  2 Sheets—Sheet 1.

W. SIDDALL.
ADDING MACHINE.

No. 419,368. Patented Jan. 14, 1890.

WITNESSES:
F. McArdle
C. Sedgwick

INVENTOR:
W. Siddall
BY Munn & Co.
ATTORNEYS.

(No Model.) 2 Sheets—Sheet 2.

W. SIDDALL.
ADDING MACHINE.

No. 419,368. Patented Jan. 14, 1890.

WITNESSES:
F. McArdle
C. Sedgwick

INVENTOR:
W. Siddall
BY
Munn & Co
ATTORNEYS.

UNITED STATES PATENT OFFICE.

WILLIAM SIDDALL, OF FRONTIER, MICHIGAN.

ADDING-MACHINE.

SPECIFICATION forming part of Letters Patent No. 419,368, dated January 14, 1890.

Application filed May 18, 1889. Serial No. 311,318. (No model.)

*To all whom it may concern:*

Be it known that I, WILLIAM SIDDALL, of Frontier, in the county of Hillsdale and State of Michigan, have invented a new and useful Improvement in Adding-Machines, of which the following is a full, clear, and exact description.

My invention relates to an improvement in adding-machines, and has for its object to provide a machine of simple and durable construction, upon which a column of figures may be expeditiously, conveniently, and accurately added.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1:
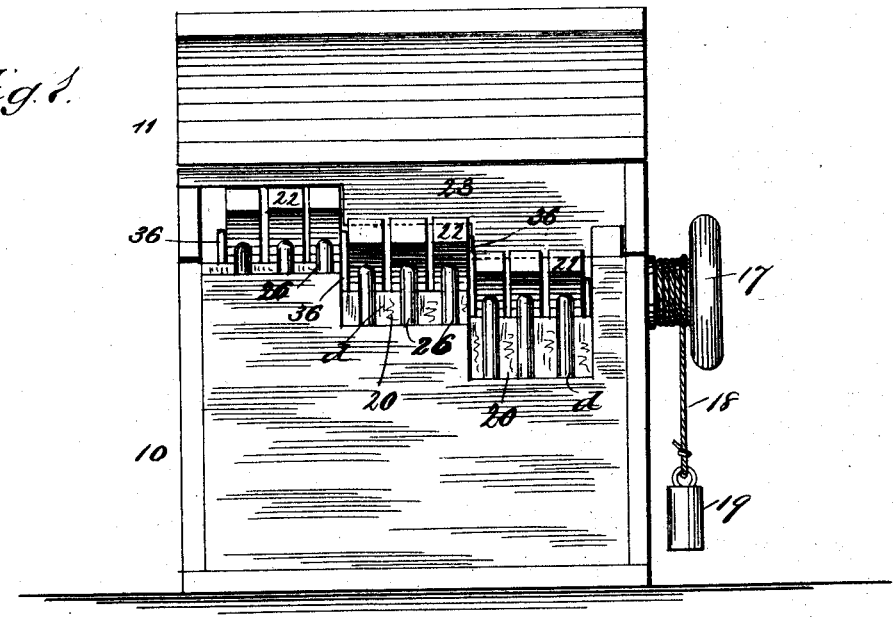
Figure 2:
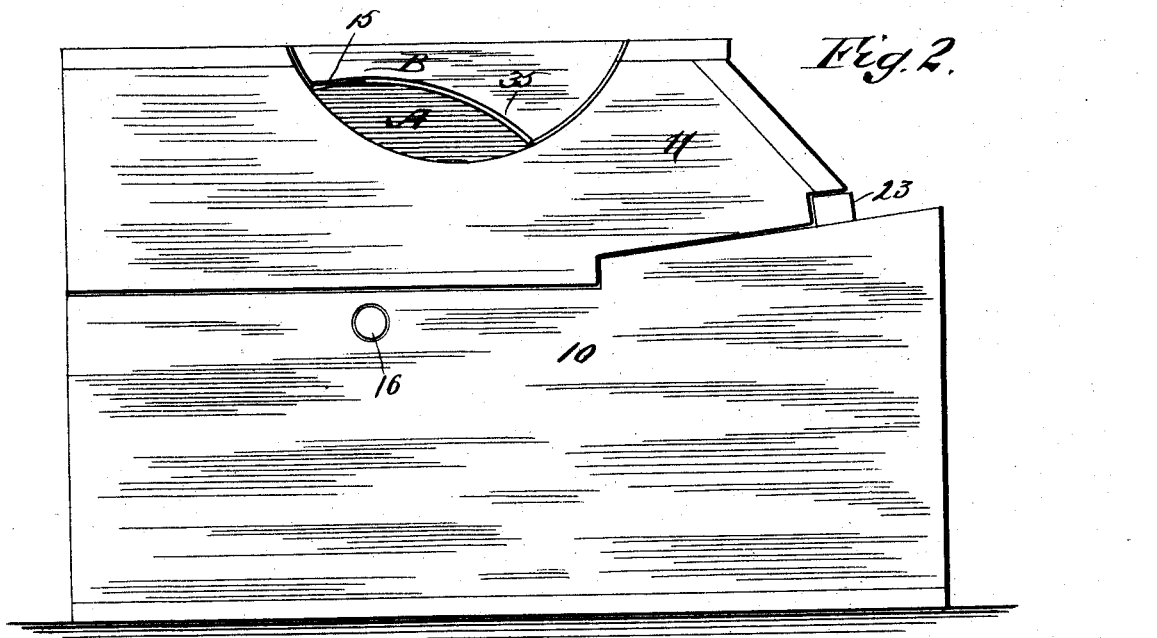
Figure 3:
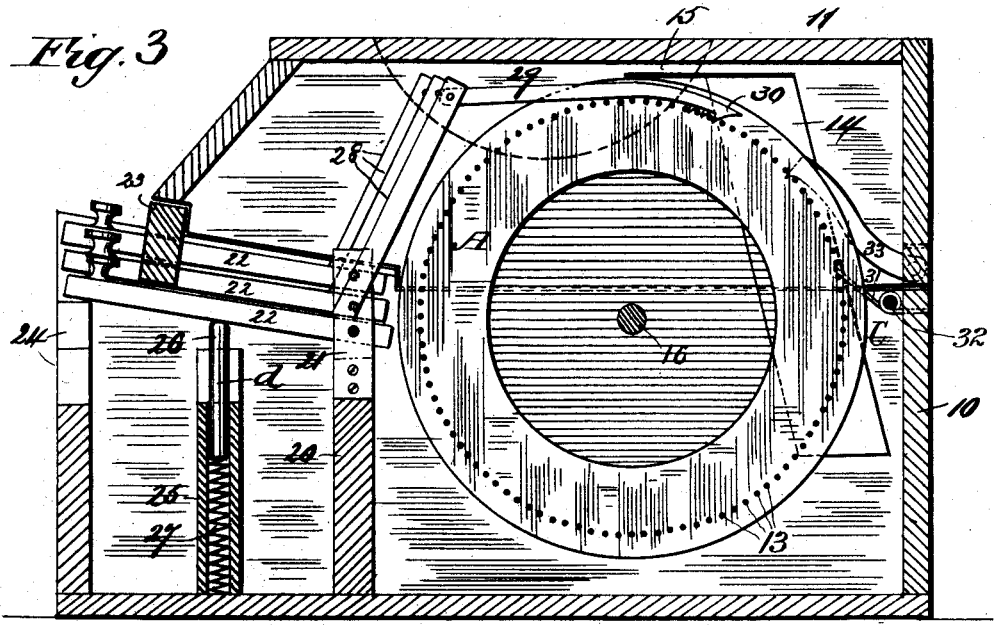
Figure 4:
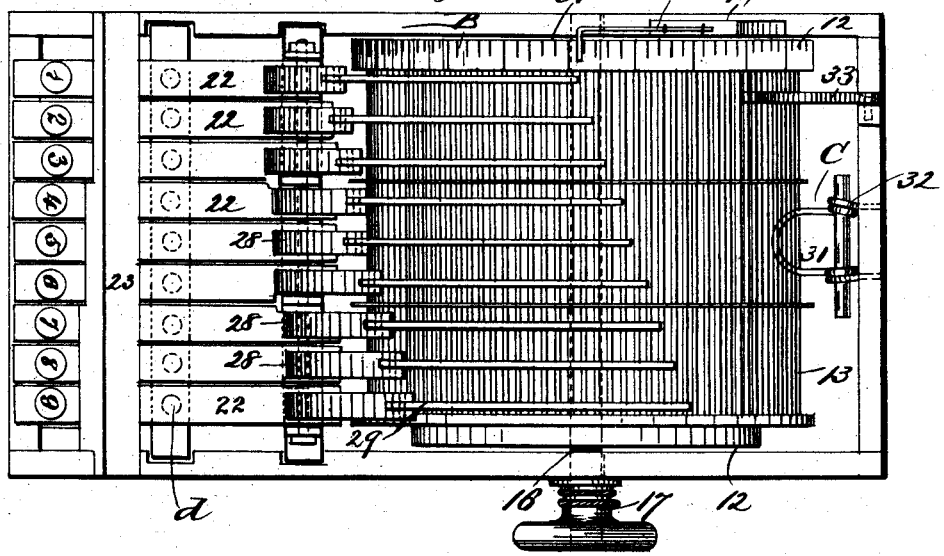

Figure 1 is a front elevation of the machine. Fig. 2 is a side view of the same. Fig. 3 is a central longitudinal section, and Fig. 4 is a plan view with the cover removed.

In carrying out the invention the body of the machine consists of a box-like receptacle 10, provided with a cover 11, detachable therefrom or attached thereto, as in practice may be found most desirable. Within the body 10 a cylinder A is held to rotate, consisting of two spaced heads 12, connected by a series of rods or ribs 13, preferably of wire, which rods or ribs are one hundred in number. Upon the periphery of one cylinder-head 12, which is wider ordinarily than the opposed head, a scale B is produced in one-hundredths. Thus, for instance, the scale is divided into sections of five or ten, each section being numbered, as the first section 10, the next section 20, or the first section 5 and the next section 10, and so the numbers upon the scale progress, starting from 0 and terminating at 100.

Upon the side of the box-like receptacle 10 a standard 14 is secured at the side nearest to the scale, and upon the said standard an angled indicating rod or finger 15 is secured, the free end of which finger rests upon the scale, and the scale is read from the finger as the drum rotates. The drum is made fast to an axle 16, which projects beyond one side of the body, and upon the said projecting end of the axle a smaller drum 17 is rigidly mounted, which drum is usually made in the form of a knob, as illustrated in Figs. 1 and 4. Upon this drum a cord 18 is secured at one end, the other end of the cord being attached to a weight 19. At each rotation of the main drum A, indicating the addition of one hundred, the smaller drum or knob 17 makes one rotation, and as prior to operating the large drum the cord 18 is entirely unwound every coil of the rope or cord that is wound upon the smaller drum 17 by the rotation of the larger one represents one hundred. Thus, in adding a column of figures, if the larger drum or cylinder when stopped were to indicate upon the scale 53 and there were five coils of cord or rope upon the smaller drum the total of the added figures would be five hundred and fifty-three; and when the figures had been added to make this total it is evident that there would actually be wound upon the smaller drum five full coils and slightly more than one-half of another coil.

In front of the large drum or cylinder A a transverse partition 20 is perpendicularly secured to the bottom of the body 10, as best illustrated in Fig. 3, the upper surface of which partition is preferably stepped, as illustrated at 21 in Fig. 3, and upon each stepped surface of the partition 20 the inner ends of three keys 22 are pivoted, which keys extend outward beneath a guide or check bar 23, the under surface of which is stepped in like manner to the upper surface of the partition 20. The keys engage the under surface of the check-bar and normally bear against the same, and when in this position they are horizontally located. The movement of the outer end of each of the several keys 22 is limited by contact with the upper edge of the front end of the box-like body. This upper edge of the front end of the body is stepped in similar manner to the upper surface of the partition 20, upon which the keys are pivoted, as illustrated at 24 in Fig. 3.

Between the end of the box-like body which is referred to and the partition 20 an intermediate vertical partition 25 is formed, of less height than the inner partition 20, the said intermediate partition being stepped in like manner to the end of the body, as illustrated in Fig. 3. Thus, the keys being arranged in banks of three, each set or bank of keys contacts with the same surface of the intermediate partition and the stepped end of the box.

For each key a spring-cushion 26 is provided, consisting of a pin $d$, inserted in a bore produced within the intermediate partition 25, the inner end of which pin rests upon a spring 27, contained in the said bore, as illustrated in Fig. 3. The spring 27 is of sufficient strength to so cause the pin above it to contact with the under face of the key that the said key will be normally held in an essentially-horizontal position and in contact with the check-bar 23. It will be understood that a cushion is provided for each of the keys.

Upon the upper face of each key a numeral is produced. Thus the first key will bear upon its face the figure 1 and the last key will bear the figure 9. Each key at its inner end is provided with a lever 28, secured to its upper surface, which levers extend at an inclination rearward essentially over the drum or cylinder A, as best shown in Fig. 3. The several levers 28 are graduated as to length, the lever attached to the key bearing the number 1 being the shortest and that attached to the key having the number 9 being the longest. Each lever 28 has pivoted in its upper end a finger 29, the fingers being graduated in like manner to the levers, and the longer fingers, or those, for instance, attached to the levers located upon the keys numbered, respectively, 6, 7, 8, and 9, are preferably curved upon their under face to adapt them to the convexity of the drum over which they stretch.

Each finger has formed at its outer extremity a latch-head 30, the said latch-head being adapted to engage with one of the rods or ribs located in the cylinder or drum. The fingers 29 are of such length that when the key bearing the number 1 is pressed downward to its farthest limit the finger attached to said key will rotate the cylinder or drum A one rod, or the distance between two of the fractional parts or indentations upon the scale. Thus if the figure 1 were opposite the pointer upon the scale and the lever bearing the number 1 were pressed downward the mark indicating two one-hundredths would be brought beneath the indicator, and if the next key pressed were that carrying the number 8 the cylinder would be rotated by the finger attached to said key eight ribs and eight marks would be carried past the indicator, causing the said indicator to register with the figure 10, for instance, or the mark upon the scale indicating such a figure.

In order to prevent the cylinder or drum from moving backward and to cause the latch-head of each finger to be at all times located between two of the cylinder-rods, except when the finger is brought into action, a tension device C is attached to the box at its rear, which consists of a piece or strip of wire 31, bent to a horseshoe or bow shape, having its ends attached firmly to the box, and coils 32, produced between the bow and the ends, as shown in Fig. 4, to cause the device to bear firmly at all times against at least one rod of the main cylinder. Thus the said cylinder is at all times prevented from moving backward to any great extent.

If the spring tension device C only were employed to check the rearward movement of the cylinder, it would back to a slight degree, and in order to obviate this and maintain the cylinder or drum A in the proper position at all times I pivot upon the body a pawl 33, which engages with the bar or rod contained in the cylinder nearer the top of the cylinder than the tension device and more to one side, the said tension device being so located as to bear upon the cylinder-rods at their center.

I desire it to be distinctly understood that if in practice it is found desirable the drum or cylinder may be made of a solid casting, in which event one hundred perpendicularly-spaced teeth are longitudinally produced upon the periphery for engagement of the fingers 29.

As heretofore stated in connection with the operation in adding up a column, the keys are pressed downward as the figures are reached in the column to which the keys correspond until the top of the column is reached. Then the number of coils upon the small drum will indicate the number of hundreds. For instance, if four coils of cord are found to be upon the small drum and 20 is indicated upon the scale, four hundred and twenty will be the amount of the column. The 0 is then set down and the small drum is turned forward until 100 is indicated upon the scale. Then as forty-two is to be carried to the next column the large cylinder is turned in any convenient manner until 42 is indicated upon the scale. The machine is then in condition for manipulation to add the figures of the next column.

The cover 11 of the box is recessed at one side, as indicated at 35 in Fig. 2, which recess exposes the indicator 15 and that portion of the scale upon which the indicator may bear.

In order to properly space the several keys, a series of rods 36 are projected downward from the under face of the check-bar 23, one of which rods is made to pass between each set of the adjoining keys, as is plainly illustrated in Fig. 1. These rods, however, may be dispensed with, if desired.

Having thus described my invention, I claim as new and desire to secure by Letters Patent—

1. In an adding-machine, the combination of a drum containing a predetermined series of ribs and having a scale on its periphery, an indicator resting on the scale, a series of pivoted and spring-pressed keys, graduated levers secured to the keys, and graduated fingers pivoted to the upper ends of the levers and adapted to engage the ribs of the drum, substantially as described.

2. In an adding-machine, the combination, with a cylinder or drum provided with a predetermined series of ribs and having a scale produced upon its outer face, a smaller drum attached to the ribbed drum or cylinder, and a weighted rope or cord secured to the said smaller drum, of a series of keys pivoted in front of the ribbed drum or cylinder, graduated levers secured to said keys, and graduated fingers pivoted to said levers, adapted to engage the ribs of the cylinder, substantially as and for the purpose specified.

3. In an adding-machine, the combination, with a receptacle, a cylinder mounted in said receptacle, provided with a predetermined number of peripheral ribs and a scale produced thereon, an indicator bearing upon said scale, and a tension device secured to the receptacle and contacting with the cylinder at its rear, of a series of keys arranged in banks of three, graduated levers secured to said keys, graduated fingers pivoted to said levers, each finger terminating in a latch-head capable of engaging the ribs in the said cylinder, all combined for operation substantially as and for the purpose specified.

4. In an adding-machine, the combination, with a receptacle, a cylinder mounted in said receptacle, provided with a predetermined number of peripheral ribs and a scale produced thereon, an indicator bearing upon the said scale, and a tension device secured to the receptacle and contacting with the cylinder at its rear, of a series of keys arranged in banks of three, one bank being lower than the other, spring-actuated cushions bearing against each of the several keys, a check-bar engaging the upper surface of the keys, graduated levers secured to the several keys at their inner ends, and graduated fingers pivoted to the said levers, said fingers being adapted for contact with the ribs of the cylinder, substantially as shown and described.

5. An adding machine comprising a rotary drum having a scale on its periphery, an indicating-finger projecting over the scale, a series of keys, means for rotating the drum from the keys, a small drum on the axle of the main drum, and a cord having one end secured to said small drum and provided with a weight at its other end, substantially as described.

WILLIAM SIDDALL.

Witnesses:
JONATHAN SHERMAN,
ELLA B. SIDDALL.